United States Patent [19]
Ohba et al.

[11] 3,898,810
[45] Aug. 12, 1975

[54] TANDEM PUMP UNIT

[75] Inventors: Motoichi Ohba; Keiichi Chiba, both of Tokyo, Japan

[73] Assignee: Nissan Motor Company Limited, Yokohama, Japan

[22] Filed: Apr. 15, 1974

[21] Appl. No.: 461,215

[30] Foreign Application Priority Data
Apr. 16, 1973 Japan.............................. 48-45452

[52] U.S. Cl. ...................... 60/413; 60/456; 60/484; 60/486
[51] Int. Cl.² ...................... F15B 1/02; F15B 11/16
[58] Field of Search ............. 60/413, 456, 484, 486

[56] References Cited
UNITED STATES PATENTS

| 3,590,580 | 7/1971 | Vaughan............................ 60/456 X |
| 3,606,051 | 9/1971 | Peterson et al.................... 60/484 X |
| R27,334 | 4/1972 | Zimmerman...................... 60/484 X |

Primary Examiner—Edgar W. Geoghegan

[57] ABSTRACT

A low pressure pump and a high pressure pump are driven in tandem to power a vehicle brake system and a power steering system respectively. The output of the power steering system is connected to the inlet of the low pressure pump to prevent cavitation.

8 Claims, 2 Drawing Figures

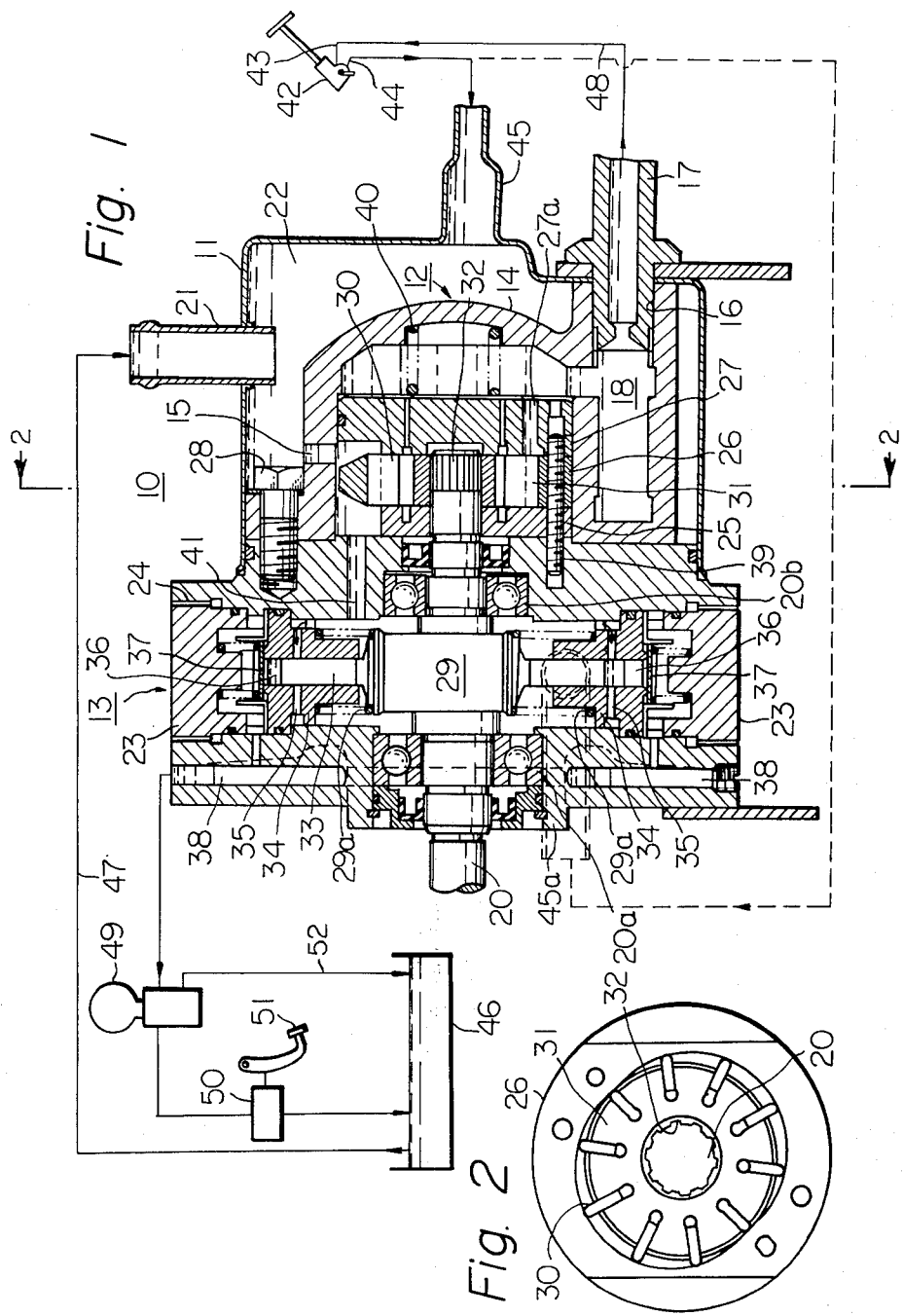

TANDEM PUMP UNIT

The present invention relates generally to a hydraulic system and in particular to a pump used in an automotive vehicle.

A pump which supplies fluid under pressure to both an open-type and a closed-type hydraulic system is known in the art. One prior art pump is known as a flow-divider in which fluid is supplied from a single pump unit, and the flow is divided into individual hydraulic lines by means of a flow divider. Although the flow-divider is simple in construction, it gives rise to a loss of hydraulic pressure within the flow divider which amounts to at least 2 kg/cm$^2$. Also, common use of the single pump unit results in a lowering of available hydraulic pressure to a considerable degree. In particular, when the flow-divider is used in an automobile wherein the pump supplies fluid to both an open-type power steering system and a closed-type power brake system, the fluid available for the brake system amounts to only one liter per minute, and therefore it takes a long time to accumulate a sufficient amount of fluid in the accumulator. Another prior art pump employs an intensifier, which increased the hydraulic pressure to be applied to a closed-type hydraulic system. Although the intensifier is also simple in construction, the hydraulic line system is considerably complicated, and the use of an intensifier only adds complexity to the hydraulic line system.

Therefore, it is an object of the present invention to provide a tandem pump unit which supplies fluid to individual hydraulic lines at sufficient hydraulic pressures.

Another object of the invention is to eliminate cavitation which might occur within an open-type pump unit.

A further object of the invention is to provide a tandem pump unit which is simple and compact in construction.

The present tandem pump unit includes a low pressure pump such as a vane pump, providing hydraulic fluid under pressure for the open-type hydraulic system of an automotive vehicle such as a power steering system, and a high-pressure pump such as a plunger pump providing hydraulic fluid under pressure for the closed-type hydraulic system of the vehicle. The two pumps have a common drive shaft and have their inlets connected to a single reservoir and their outlets connected to the respective hydraulic lines leading to the power steering and brake systems. Each of the respective pumps provides different hydraulic pressure as required for each of the hydraulic lines. Since the open-type hydraulic system draws a greater amount of fluid than is required for the closed-type system and the inlet ports of the two hydraulic systems are connected to each other, cavitation would normally occur within the open-type pump. The present invention is characterized in that the hydraulic outlet of the power steering system is connected to the inlet port of the low pressure pump to circulate fluid through the low pressure pump and the power steering system so that fluid discharged from the power steering system is directly applied to the low pressure pump via the shortest possible route, thereby eliminating cavitation. Since excess heat may be accumulated in the circulating fluid, the present embodiment may be modified to circulate part of the fluid discharged from the steering system through part of the high pressure pump and then into the low pressure pump. Part of the fluid introduced into the high pressure, or plunger pump will be pumped to the brake system while the remaining part will be introduced into the low pressure, or vane pump where it will be mixed with a fresh supply of fluid from the reservoir.

The present invention will become clear from the following description taken in conjunction with the accompanying drawings, in which:

FIG. 1 is a schematic view, partly in section of a hydraulic system of an automotive vehicle embodying tandem pump unit of the present invention; and FIG. 2 is a sectional view in elevation of a vane pump of a tandem pump unit of the present invention taken along a line 2—2 of FIG. 1.

Referring to FIG. 1, a tandem pump unit 10 according to the present invention generally comprises a pump housing 11 covering a low pressure pump such as a vane pump 12 and a high pressure pump such as a plunger pump 13. In this exemplary embodiment, the vane pump 12 and plunger pump 13 are intended for the sole purpose of illustrating the concept of the invention, and any type of low pressure and high pressure pumps may be employed. The vane pump 12 comprises a housing 14 having an inlet passage 15 and an outlet port 16 through which a conduit 17 extends and an outlet chamber 18 leftward as shown of the conduit 17. In the housing 14 are seated a side plate 25, cam ring 26 and side plate 27 in a side-by-side relationship and held in position by a pin 39 and a spring 40. Since the present invention is not concerned with the construction of the vane pump 12, the details thereof are omitted. The side plate 27 has a plurality of openings 27a (only one is shown) which serve as outlet passages for discharging fluid into the chamber 18. The cam ring 26 of a well known construction surrounds a plurality of vanes 30, which resiliently extend radially outwardly from the periphery of a rotating disc 31 into contact with the elliptically formed inner periphery of the cam ring (FIG. 2). The rotating disc 31 is connected to a drive shaft 20 by splines 32, the shaft 20 being rotatably supported by bearings 20a and 20b. Upon rotation of the shaft 20, pressurized fluid is discharged through the opening 27a of the side plate 27, chamber 18, outlet port 16 and conduit 17. The housing 11 defines with the vane pump 12 a chamber 22, and has a fluid inlet port or conduit 21 adjacent to the passage 15 to provide communicaition therewith. The plunger pump 13 has a cylindrical housing 23 coupled to a partition 24 fastened to the housing 14 by screws 28 (only one is shown). An eccentric cam 29 is coupled to the shaft 20 and resiliently supported within the cylindrical housing 23 by a pair of springs 29a. A pair of opposedly movable plungers 33 are operatively connected to the cam 29, and are slidable in blocks 34 so that upon rotation of the shaft 20 the plungers 33 reciprocate therethrough. The blocks 34 define inlet passages 35 which lead to passages 36. Reciprocating movement of the plungers 33 forces fluid from the passages 35 and 36 through check valves 37 into an outlet passage 38. A passage 41 is provided through the partition 24 to connect the passage 15 of the vane pump 12 to the passages 35 of the plunger pump 13. The housing 24 of the vane pump 12 is further provided with an additional inlet port 45 remote from the inlet passage 15 of the vane pump 12.

A reservoir 46 is provided to supply fluid through a conduit 47 to the inlet conduit 21 of the tandem pump unit 10. Upon rotation of the drive shaft 20, suction develops within the vane pump 12 and plunger pump 13 which causes fluid to enter the pumps through the passages 15, 41 and 35. Hydraulic fluid under pressure is fed through the outlet port 17 and a conduit 48 to an inlet port 43 of a power steering actuating system 42 of an automobile. Discharged fluid from the steering system 42 is fed to the additional inlet port 45 of the vane pump 12 through an outlet port 44. Although the discharged fluid may be drained off directly into the reservoir 46, this would cause cavitation within the vane pump 12, since the inlet passages of the two pumps are connected together, the combined suction power of the two pumps, particularly of the vane pump 12, is such that it causes a shortage in the inlet flow to the tandem pump unit 10. Circulating fluid through the vane pump 12 thus overcomes the problem of cavitation. However, with the above arrangement, excessive heat may be accumulated in the circulating fluid. This disadvantage is overcome by providing an inlet port 45a to the housing 23 instead of the port 45, leading to the inlet passages 35 of the plunger pump 13 from the outlet port 44 of the steering system 42 as shown in dashed line. With this arrangement, a substantial part of the fluid introduced into the plunger pump 13 will be pumped therethrough and the remaining part thereof will overflow through the passage 41 of the partition 24 into the vane pump 12, where it will be mixed with a fresh supply of fluid from the reservoir 46.

The outlet passage 38 of the plunger pump 13 is connected to an accumulator 49, which keeps fluid in storage at high hydraulic pressure for delivery to a booster 50 of the brake system to which a brake pedal 51 is operatively connected. A bypass line 52 is provided to bypass fluid around the accumulator 49 to prevent the pressure in the accumulator 49 from exceeding a predetermined value.

What is claimed is:

1. In a motor vehicle having a closed-type hydraulic system, an open-type hydraulic system and a hydraulic fluid reservoir, and a pump unit, said pump unit comprising:
    a low pressure pump having a first outlet connected to an inlet of the open-type hydraulic system and a first inlet;
    a high pressure pump drivable in common with said low pressure pump and having a second outlet connected to an inlet of the closed-type hydraulic system and a second inlet;
    an outlet of the closed-type hydraulic system being connected to the fluid reservoir and said first and second inlets communicating with both the fluid reservoir and an outlet of the open-type hydraulic system.

2. A pump unit according to claim 1, further comprising a housing formed around said low pressure pump and defining therewith a chamber, said chamber communicating with the reservoir and said first inlet, said second inlet being connected to said first inlet by a passageway.

3. A pump unit according to claim 2, in which the outlet of the open-type hydraulic system communicates directly with said chamber.

4. A pump unit according to claim 2, in which the outlet of the open-type hydraulic system communicates directly with said second inlet.

5. A pump unit according to claim 2, further comprising an accumulator connected between said second outlet and the closed-type hydraulic system.

6. A pump unit according to claim 5, in which said accumulator includes bypass means to bypass fluid from said second outlet to the reservoir to prevent the pressure in said accumulator from exceeding a predetermined value.

7. A pump unit according to claim 1, in which said low pressure pump is a vane pump.

8. A pump unit according to claim 1, in which said high pressure pump is a plunger pump.

* * * * *